United States Patent [19]

Janich

[11] 4,412,556

[45] Nov. 1, 1983

[54] DEVICE FOR SHUTTING OFF LARGE PIPES

[76] Inventor: Hans-Jurgen Janich, Regelkamp 12, D-4720 Beckum, Fed. Rep. of Germany

[21] Appl. No.: 266,516

[22] Filed: May 22, 1981

[30] Foreign Application Priority Data

Jun. 24, 1980 [DE]  Fed. Rep. of Germany ....... 3023639

[51] Int. Cl.³ .............................................. F16K 1/22
[52] U.S. Cl. .............................. 137/614.11; 137/601; 74/470; 74/471 R; 251/279
[58] Field of Search ............. 74/470, 471 R; 137/601, 137/614.11, 613; 251/279

[56] References Cited

U.S. PATENT DOCUMENTS

| | | | |
|---|---|---|---|
| 2,165,640 | 7/1939 | Marx | 137/614.11 |
| 2,339,867 | 1/1944 | Monn, Jr. | 74/471 |
| 3,044,387 | 7/1962 | Hinden | 137/601 |
| 3,346,013 | 10/1967 | Reichow | 137/601 |
| 3,604,458 | 9/1971 | Silvey | 137/601 |
| 4,080,978 | 3/1978 | McCabe | 137/601 |
| 4,187,878 | 2/1980 | Hughey | 137/601 |
| 4,199,898 | 4/1980 | Connor | 137/601 |
| 4,241,647 | 12/1980 | Herr | 137/601 |

Primary Examiner—A. Michael Chambers
Attorney, Agent, or Firm—Learman & McCulloch

[57] ABSTRACT

The invention relates to a device for shutting off large pipes in which a two-armed first lever (14) is connected through one arm (14a) to the actuating rod (9) while its other arm (14b) acts on a spring (15), while the two-armed second lever (16) is connected by one arm (16a) to the spring (15) while its other arm (16b) forms the pivot bearing (17) for the first lever (14). This arrangement enables the space occupied by the lever arrangement to be significantly reduced and provides for a simple construction.

15 Claims, 4 Drawing Figures

DEVICE FOR SHUTTING OFF LARGE PIPES

This invention relates to a device for shutting off large pipes comprising several pivotal flaps operable by a common drive, an actuating rod being pivotally connected to a first lever which engages through a spring with a second lever fixedly connected to the flap shaft.

One known device of this type is described for example in German Utility Model No. 74 27 871. In this case, the first lever connected to the actuating rod is rotatably mounted via a hub on the flap shaft which in turn is fixedly connected through two hubs to the second lever.

Further development of this known arrangement has shown that it is desirable in particular further to reduce the space occupied by the lever arrangement (particularly with a view to accommodating compensators of the type required with flaps such as these and in cases where the flaps are in the form of double flaps). A further object of the present invention is to construct the lever arrangement in such a way that minimal bending moments are generated and further in such a way that the device as a whole is easy to manufacture.

According to the invention, this object is achieved by combination of the following features:

(a) the double-armed first lever is connected through one arm to the actuating rod whilst the other arm acts on the spring, (b) the double-armed second lever communicates through one arm with the spring whilst its other arm forms the pivot bearing for the first lever.

Since, in the device according to the invention, the first lever connected to the actuating rod is not mounted on the flap shaft, but instead on one arm of the second lever, considerably less space is required, the load applied to the levers is more favourably distributed (as reflected in particular in a lower bending moment) and a considerably simplified construction is obtained. In particular, there is now only one hub on the flap shaft (establishing the fixed connection between the second lever and the flap shaft).

These and other features of the invention will become apparent from the following description of a preferred embodiment illustrated in the accompanying drawings, wherein.

Figure 1:
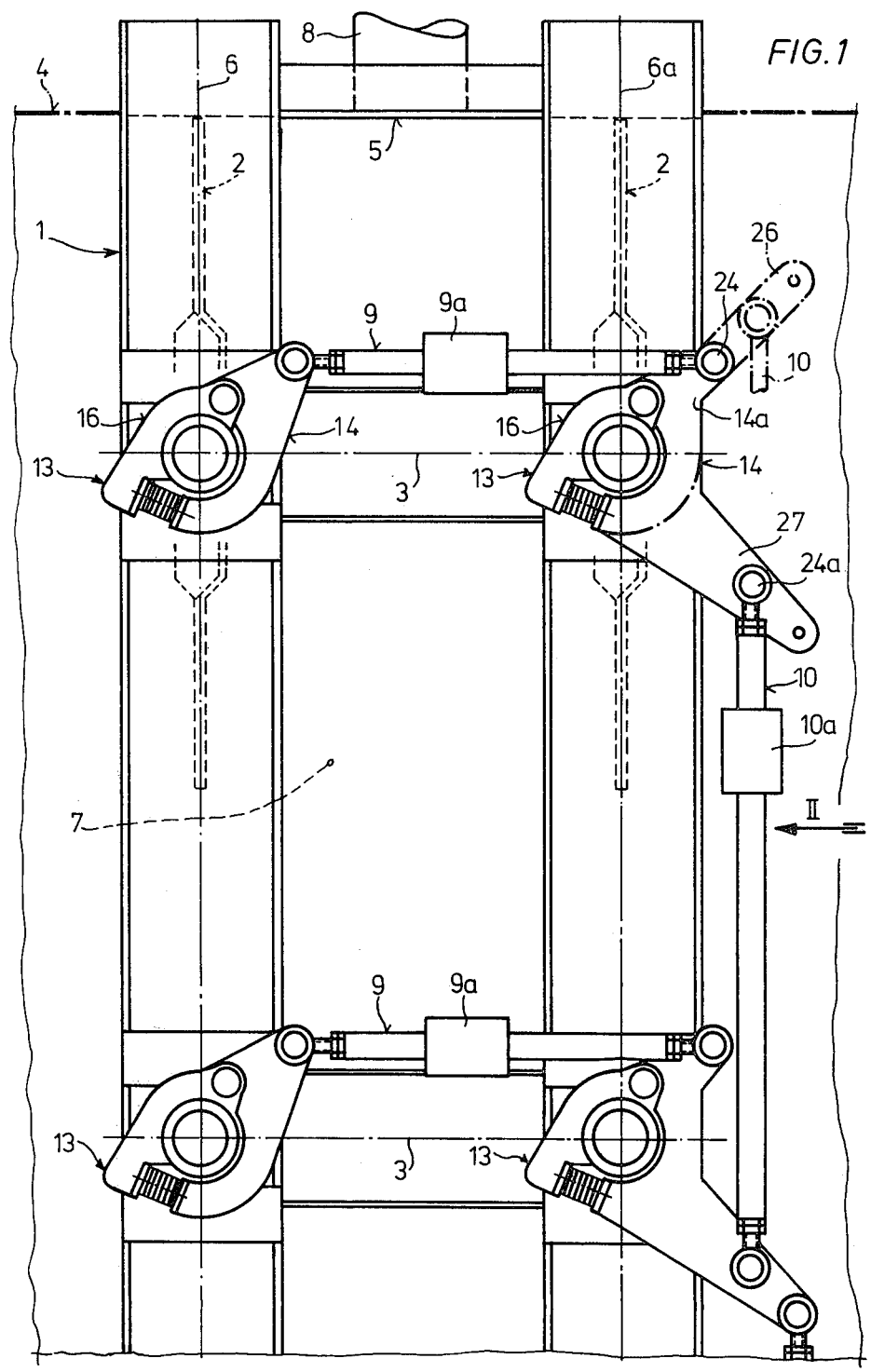
FIG. 1 is a side elevation of part of the shut-off device.

The general structure of the device 1 for shutting off large pipes will first of all be described with reference to FIGS. 1 and 2. The drawing which is largely diagrammatic is largely confined to those parts which are essential for explaining the invention.

The shut-off device 1 comprises a number of identical pivotal flaps 2 which are designed to be operated by a common drive (not shown in detail) which may be formed either by a manual drive or by a motor drive.

Figure 2:
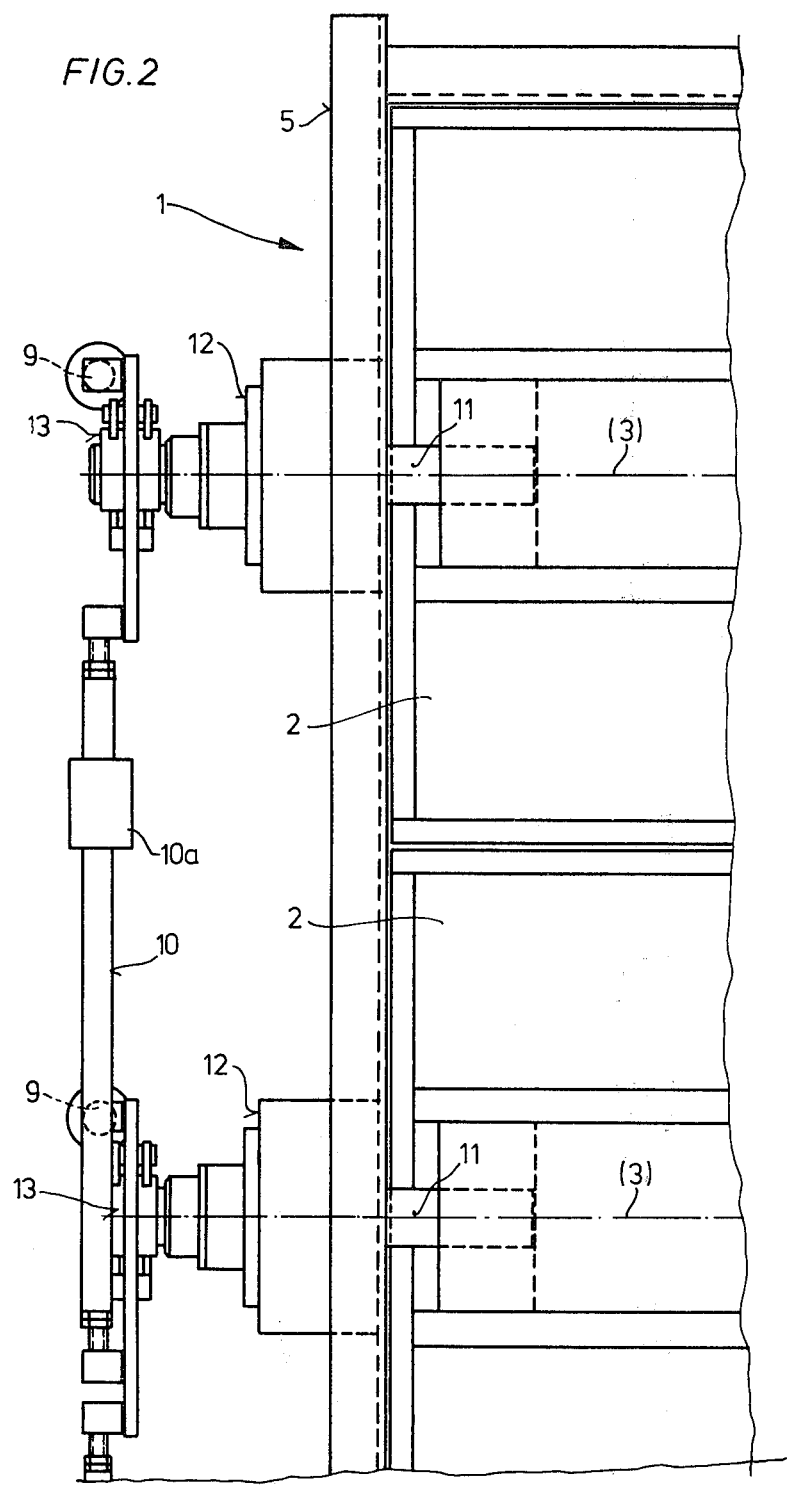
FIG. 2 is a partial front elevation of the device illustrated in FIG. 1 (in the direction of arrow II in FIG. 1).

Referring to FIG. 1, it can be seen that two pivotal flaps 2 (of which only the upper half is shown in chain lines in FIG. 1) are arranged at a distance (relative to the pipe shown in chain lines only at 4, at an axial distance) apart from one another in several horizontal planes 3 extending substantially parallel to the longitudinal axis of the pipe in the housing 5 of the device 1. In addition, several pivotal flaps 2 are arranged in two transverse planes 6, 6a which extend perpendicularly of the longitudinal axis of the pipe at an axial distance apart from one another and in which the two above-mentioned pivotal flaps 2 of each horizontal plane 3 are situated. In the arrangement shown in FIG. 1, the transverse planes 6, 6a extend substantially vertically so that the flaps 2 lying in these vertical planes 6, 6a each form a group of vertical flaps which are spaced apart from one another in the axial direction of the pipe 4. In the closed position, i.e. in the shut-off position, of the device 1, the pivotal flaps 2 of each group lying in a vertical plane 6, 6a form a surface which completely shuts off the pipe cross-section. It can also be seen from FIG. 1 that, between the two groups of flaps arranged in the vertical plane 6, 6a, there is a space 7 which can be supplied with a sealing medium (gas or liquid) through a pipe connection 8 arranged on the housing 5.

As also shown in FIG. 1, the pivotal flaps 2 spaced apart from one another in the horizontal planes 3 are each interconnected by an actuating rod 9 for the purpose of a common pivoting movement. In the embodiment illustrated, these actuating rods 9 extend substantially horizontally. However, it is not only the pivotal flaps 2 which are situated adjacent one another in the direction of the longitudinal axis of the pipe, but also the pivotal flaps 2 arranged in groups in the transverse planes, i.e. in the vertical planes 6, 6a and, hence, all the pivotal flaps on the device 1 which are interconnected to make a common pivoting movement. For this reason, it is only the two adjacent pivotal flaps 2 of one of the groups of vertical flaps 2 arranged in the vertical planes 6, 6a (in FIG. 1, the group in the vertical plane 6a) that are connected by a common actuating rod 10. Both the first actuating rods 9 and also the second actuating rods 10 are adjustable in length, as indicated by threaded adjusting elements 9a and 10a in FIG. 1.

In the embodiment illustrated, each pivotal flap 2 is provided at either axial end with a shaft stub 11 through which it is mounted in a bearing 12. The pivotal flaps 2 are preferably in the form of double-vaned flaps relative to their shaft axis which lies in the horizontal plane 3.

Accordingly, in the illustrated embodiment, the device 1 described thus far is provided with two transverse groups of pivotal flaps 2 arranged together in the manner of shutters.

To enable the actuating movement emanating from the common drive and transmitted by the actuating rods 9 and 10 to be applied to each pivotal flap 2, a lever arrangement 13 is provided at one axial end of each pivotal flap 2 at least on the free end of the shaft stub 11, being connected to one end of the associated actuating rod 9, 10. A lever arrangement 13 such as this is described in more detail in the following with reference to FIGS. 3 and 4.

Each lever arrangement 13 comprises a first lever 14 which is pivotally connected to the corresponding end of an actuating rod, for example 9, and which is in engagement through a spring 15 with a second lever 16 fixedly connected to the flap shaft, i.e. to the associated shaft stub 11. The two-armed first lever 14 is connected to the actuating rod 9 through a first arm 14a, whilst the second arm 14b of this first lever 14 acts on the spring 15 (cf. FIG. 3). In addition, the two-armed second lever 16 is connected to the spring 15 through its first arm 16a, whilst its second arm 16b forms the pivot 17 for the first lever 14. The oppositely directed lever arms 14b and 16a of the two levers 14 and 16 are thus damped in their actuating effect by the arrangement of the spring 15, for example in the form of a spring pack.

Figure 3:
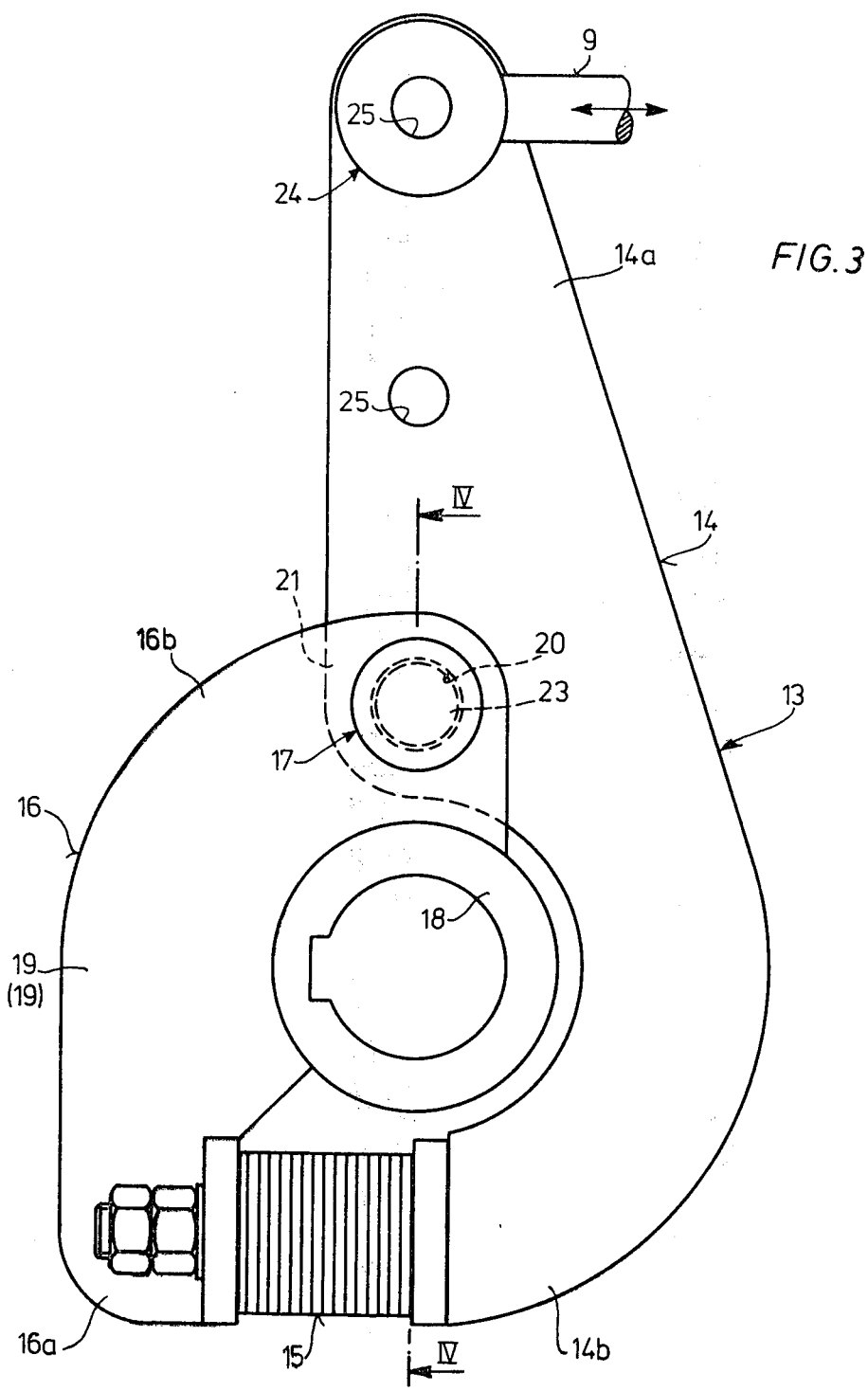
FIG. 3 is a side elevation on a larger scale of the coordinated arrangement of two levers intended for the pivoting movement of a pivotal flap.
Figure 4:
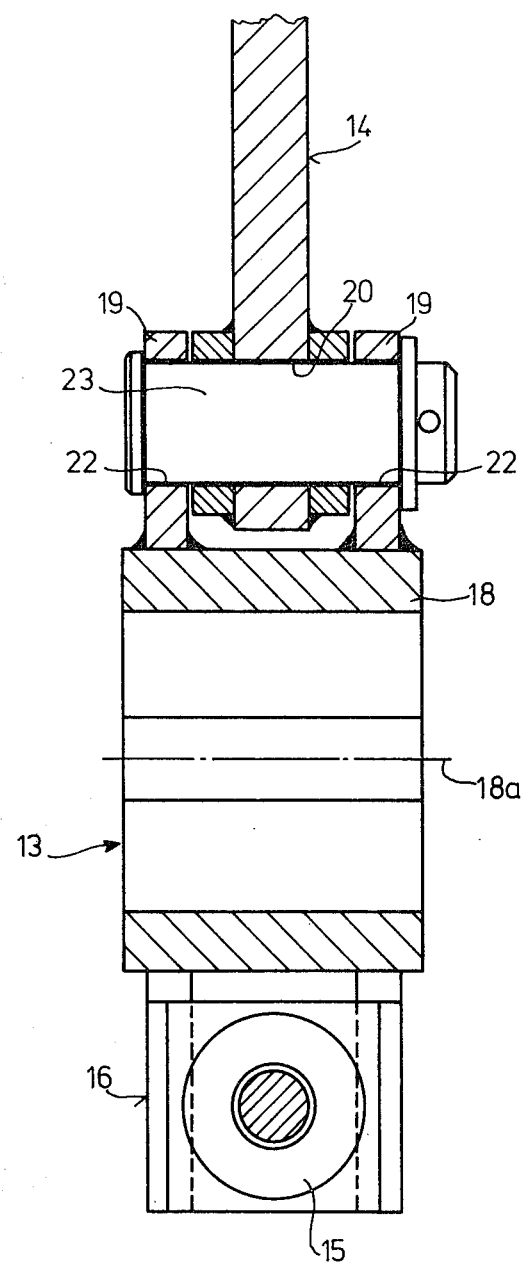
FIG. 4 is a sectional view taken on the line VI—VI in FIG. 3.

In the lever arrangement 13 shown in FIGS. 3 and 4, the second lever 16 comprises a hub 18 which is fixedly connected to the shaft stub 11 (not shown here) and two identical match plates 19 which are fixed (preferably welded) to the outer periphery of the hub at an interval from and parallel to one another perpendicularly of the longitudinal axis 18a of the hub. These two match plates 19 together form the two lever arms 16a, 16b and, between their ends forming the pivot 17 for the first lever 14 (i.e. on the lever arm 16b), they accommodate the central part 21 of the first lever 14 which contains a bore 20 for a pivot. The pivot bearing 17 may be kept relatively simple in terms of its construction insofar as it is essentially formed by the two ends of the match plates 19 situated in the region of the lever arm 16b and by a pivot pin 23 guided through the bore 20 for the pivot bearing in the first lever 14 and through two bores 22 provided in the ends of the match plates 19.

Whereas the hub 18 of the second lever 16 is fixedly connected to the associated shaft stub 11 of the flap 2 (for example with the assistance of a feather key or wedge), a pivotal connection between the first lever 14 and the actuating rod 9 is provided in the usual way on the first arm 14a of the first lever 14. For this pivotal connection 24, the first lever arm 14a may comprise several bores 25 (as indicated), so that the effective length of the lever arm 14a may be altered as required by positioning the articulation 24 at one or the other bore 25. In the embodiment of the lever arrangement 13 illustrated in FIGS. 3 and 4, the pivot 17 for the first lever 14 is provided at one end of the flap shaft, i.e. the shaft stub 11, whereas the spring 15 and the lever arms 14b and 16a in engagement therewith of the first and second levers 14 and 16 are arranged substantially at the opposite ends of the flap shaft. This arrangement provides for a particularly favourable lever action and, hence, for reliable actuation of the flap despite its simple construction.

In the embodiment illustrated in FIGS. 3 and 4, the first arm 14a of the first lever 14 connected to the actuating rod 9 is arranged on the same side of the flap shaft as the pivot 17. If FIG. 1 is viewed in the same way, it can be seen that, in principle, this arrangement applies to the lever arrangements 13 of both groups of flaps arranged in the vertical planes 6, 6a. However, in the case of the group of flaps arranged in the vertical plane 6a, provision has to be additionally made to ensure that adjacent flaps 2 can also be pivotally connected to the associated second actuating rod 10. To this end, the first lever 14 in the lever arrangement 13 of each flap of this group may be provided on its first arm 14a, which is connected to the first actuating rod 9, with an extension 26 to which the second actuating rod 10 may be pivotally connected, as indicated in dash-dot lines at the top right of FIG. 1. A second possibility for the pivotal connection of the second actuating rod to the first lever 14 is indicated by solid lines on the right-hand side of FIG. 1. In this case, the first lever 14 comprises the articulation 24 already described with reference to FIGS. 3 and 4 on its lever arm 14a and additionally comprises a fixed extension 27 resembling a lever arm for the pivotal connection (articulation 24a) of the second actuating rod 10. In many cases, this construction may be more favourable than the first construction in terms of overall arrangement and operation.

I claim:

1. In apparatus for regulating the flow of fluid through a large, elongate pipe including a number of shafts spaced from one another and mounted on said pipe for rotation about parallel axes transverse to the longitudinal axis of said pipe, a plurality of flaps corresponding to the number of said shafts and connected to the latter for rotation therewith between one rotary position in which said flaps oppose the flow of fluid longitudinally of said pipe and a second rotary position facilitating the flow of fluid longitudinally of said pipe, and common drive means connected to said shafts for rotating them concurrently, the improvement wherein said drive means comprises first and second double-arm levers for each of said shafts, one of said levers being fixed to the associated shaft and having one arm thereof pivotally connected to one arm of the second of said levers; and an actuating rod connecting said one arm of each of said second levers to the corresponding arm of an adjacent one of said second levers, whereby rotation of any one of said levers is imparted to the remainder thereof.

2. Apparatus according to claim 1 wherein said one lever comprises a hub fixedly connected to the associated shaft and two match plates which are fixed to the outer periphery of the hub at a distance from and parallel to one another perpendicularly of the axis of the hub which together form the two lever arms and between their ends accommodate that part of the second lever which is pivotally connected to said first lever.

3. Apparatus according to claim 2 wherein said match plates have bores and said part of said second lever has an opening through which extends a pivot pin.

4. Apparatus according to claim 1 wherein the pivotal connection between said one arm of said first and second levers lies at one end of the associated shaft while the other arms of said levers are at the opposite end of such shaft.

5. Apparatus according to claim 1 wherein said one arm of the second lever which is connected to the actuating rod is arranged at the same end of the associated shaft as the pivotal connection of said levers.

6. Apparatus according to claim 1 wherein said one arm of at least one of said levers includes means for connecting such one arm to a second actuating rod.

7. Apparatus according to claim 1 wherein said one arm of each of said levers includes means for connecting such arm to a second actuating rod.

8. Apparatus according to claim 1 wherein said actuating rod is adjustable in length.

9. Apparatus according to claim 1 wherein said shafts are spaced apart from one another a distance enabling said flaps in said one position thereof to fill the space between said shafts.

10. Apparatus according to claim 1 wherein said shafts extend through a pipe transversely of its longitudinal axis and wherein said flaps in said one rotary position of said shafts extend transversely of said axis and engage the adjacent flap to occupy the space between said shafts and in said second rotary position of said shafts extend substantially parallel to said axis.

11. Apparatus according to claim 1 wherein at least two of said shafts are spaced from one another axially of said pipe and in a plane parallel to the longitudinal axis of said pipe.

12. Apparatus according to claim 1 wherein a plurality of said shafts lie in a plane perpendicular to the longitudinal axis of said pipe.

13. Apparatus according to claim 12 wherein the spacing between the shafts in the perpendicular plane is such that the flaps associated therewith block said pipe in said one rotary position of said shafts.

14. Apparatus according to claim 12 wherein said shafts include a number of groups thereof, the shafts of each group lying in a plane perpendicular to the longitudinal axis of said pipe and the shafts of each adjacent group being spaced apart axially of said pipe.

15. In apparatus for regulating the flow of fluid through a large, elongate pipe including a number of shafts spaced from one another and mounted on said pipe for rotation about parallel axes transverse to the longitudinal axis of said pipe, a plurality of flaps corresponding to the number of said shafts and connected to the latter for rotation therewith between one rotary position in which said flaps oppose the flow of fluid longitudinally of said pipe and a second rotary position facilitating the flow of fluid longitudinally of said pipe, and common drive means connected to said shafts for rotating them concurrently, the improvement wherein said drive means comprises first and second double-arm levers for each of said shafts, one of said levers being fixed to the associated shaft and having one arm thereof pivotally connected to one arm of the second of said levers; spring means connecting the other arm of said one of said levers to the other arm of the second of said levers; and an actuating rod connecting said one arm of each of said second levers to the corresponding arm of an adjacent one of said second levers, whereby rotation of any one of said levers is imparted to the remainder thereof.

* * * * *